(12) United States Patent
Lee (10) Patent No.: US 12,074,502 B2
(45) Date of Patent: Aug. 27, 2024

(54) GENERATOR-DRIVING DEVICE USING MAGNETISM

(71) Applicant: Hee Chul Lee, Goyang-si (KR)

(72) Inventor: Hee Chul Lee, Goyang-si (KR)

(*) Notice: Subject to any disclaimer, the term of this patent is extended or adjusted under 35 U.S.C. 154(b) by 0 days.

(21) Appl. No.: 18/293,179

(22) PCT Filed: Dec. 26, 2022

(86) PCT No.: PCT/KR2022/021271
§ 371 (c)(1),
(2) Date: Jan. 29, 2024

(87) PCT Pub. No.: WO2023/136506
PCT Pub. Date: Jul. 20, 2023

(65) Prior Publication Data
US 2024/0258876 A1    Aug. 1, 2024

(30) Foreign Application Priority Data
Jan. 12, 2022    (KR) .................. 10-2022-0004742

(51) Int. Cl.
*H02K 7/075*    (2006.01)
*H02K 7/18*    (2006.01)

(52) U.S. Cl.
CPC .............. *H02K 7/18* (2013.01); *H02K 7/075* (2013.01); *H02K 2213/09* (2013.01)

(58) Field of Classification Search
CPC ....... H02K 7/18; H02K 7/075; H02K 2213/09
See application file for complete search history.

(56) References Cited

U.S. PATENT DOCUMENTS

| 2,790,095 A |   | 4/1957 | Peek et al. |
| 5,172,784 A | * | 12/1992 | Varela, Jr. ............... B60L 50/62 |
|   |   |   | 180/65.265 |

(Continued)

FOREIGN PATENT DOCUMENTS

| DE | 3117377 A1 | 12/1982 |
| KR | 10-1998-0021770 A | 6/1998 |

(Continued)

*Primary Examiner* — Naishadh N Desai
(74) *Attorney, Agent, or Firm* — Bridgeway IP Law Group, PLLC; Sang Ho Lee; Hyun Woo Shin (57) ABSTRACT

The present invention relates to a generator-driving device using magnetism, the device using attraction and repulsion of magnetism to move a magnet movement plate of a piston part in reciprocation, and converting reciprocating motion into rotary motion to drive a generator, thereby generating electric power. Therefore, the present invention can convert reciprocating motion into rotary motion to use same as the power for driving a generator when the piston is in operation, the reciprocating motion being due to attraction and repulsion, allows freedom in terms of installation locations, can power a compact generator used for agricultural machinery or device, residential houses or pensions, and the like, with suitable arrangement and number, according to need, of magnets on a magnet rotary plate and a magnet movement plate in a piston, and allows expense to be far lower than the installation and incidental expenses necessary for power generation using natural energy such as wind power and solar heat.

9 Claims, 11 Drawing Sheets

(56) References Cited

U.S. PATENT DOCUMENTS

| | | | | |
|---|---|---|---|---|
| 5,592,036 | A * | 1/1997 | Pino | H02K 33/16 |
| | | | | 310/34 |
| 2002/0121815 | A1* | 9/2002 | Sullivan | F02B 75/16 |
| | | | | 310/33 |
| 2006/0131887 | A1* | 6/2006 | Gosvener | F03G 7/08 |
| | | | | 290/1 R |
| 2006/0244327 | A1 | 11/2006 | Kundel | |
| 2014/0246867 | A1* | 9/2014 | Zhou | F02G 5/02 |
| | | | | 290/40 C |
| 2019/0372426 | A1* | 12/2019 | Van Gelder | B60T 13/586 |

FOREIGN PATENT DOCUMENTS

| | | |
|---|---|---|
| KR | 10-2000-0010065 A | 2/2000 |
| KR | 10-2008-0034231 A | 4/2008 |
| KR | 10-2008-0107184 A | 12/2008 |
| KR | 10-2011-0120799 A | 11/2011 |
| KR | 10-2014-0135800 A | 11/2014 |
| KR | 10-2015-0051521 A | 5/2015 |
| KR | 10-2019-0060836 A | 6/2019 |

\* cited by examiner

First magnet rotation plate

Magnet movement plate

Second magnet rotation plate

GENERATOR-DRIVING DEVICE USING MAGNETISM

TECHNICAL FIELD

The present invention relates to a generator-driving device using magnetism, more specifically to a generator-driving device using magnetism that is capable of allowing a magnet movement plate of a piston to reciprocate by means of attraction and repulsion of magnetism and thus converting reciprocating motions into rotary motions to drive a generator, thereby generating electric power.

BACKGROUND ART

A conventional generator-driving device is configured to allow a main shaft 16 to which a disc type magnet carrier 12 is fixed to linearly reciprocate between disc type magnet carriers 4 and 8 fixed to the main shaft 16 by means of spool assemblies 26 to thus rotate a crankshaft assembly 40, thereby making it hard to generate a driving force uniformly. As a result, power is not accurately transmitted to a device requiring the power.

(Patent document 1) Patent document 1. Korean Patent Application Laid-open No. 10-2014-0135800 'Permanent magnet driving device and operating method therefor' (Dated on Nov. 26, 2014)

DISCLOSURE OF THE INVENTION

Technical Problems

Accordingly, the present invention has been made in view of the above-mentioned problems occurring in the related art, and it is an object of the present invention to provide a generator-driving device using magnetism that is capable of allowing a magnet movement plate of a piston to reciprocate by means of attraction and repulsion of magnetism and thus converting reciprocating motions into rotary motions to drive a generator.

Further, other objects of the present invention may be inferred through the following description.

Technical Solutions

To accomplish the above-mentioned objects, according to one aspect of the present invention, there is provided a piston comprising magnet rotation plates spaced apart from each other at a given distance on both sides thereof in such a way as to be rotatably fixed to a rotating shaft disposed at the inside of a driving motor if start power is transmitted thereto, each magnet rotation plate having a plurality of magnets located at the inside of the outer periphery thereof in such a way as to allow one magnet to have different polarities from the neighboring magnet and a magnet movement plate reciprocating along the rotating shaft between the magnet rotation plates and having a plurality of magnets located at the inside of the outer periphery thereof in such a way as to allow one magnet to have different polarities from the neighboring magnet, while facing the magnets of the magnet rotation plates, so that while the magnet movement plate is rotating together with the magnet rotation plates if the magnets facing the magnets of the magnet rotation plates have different polarities from the magnets of the magnet rotation plates, attraction occurs, and if the magnets have the same polarities as the magnets of the magnet rotation plates, repulsion occurs; a crank comprising a reciprocating rod connected to one side of the magnet movement plate in such a way as to move forward and backward during the reciprocation of the magnet movement plate, a crankshaft connected to the other side of the reciprocating rod to convert the linear motions caused by the forward and backward movements of the reciprocating rod into rotary motions, and a driving gear located at a given position of the crankshaft in such a way as to be connected to a driven gear from which the number of revolutions larger than the number of revolutions caused by the rotary motions of the crankshaft is generated; and a generator comprising the driven gear located inside the crank in such a way as to receive the rotational force from the driving gear to receive electric power required for power generation from the driven gear.

Advantageous Effects of the Invention

Therefore, the present invention can convert reciprocating motion made due to attraction and repulsion during the operation of the piston into rotary motion to make use of the rotary motion as the power for driving the generator, can activate a compact generator used for agricultural machinery or device, residential houses or pensions, and the like, with suitable arrangement and number, according to need, of magnets on the magnet rotation plates and the magnet movement plate disposed in the piston, without any restriction in installation places, and allow expense to be far lower than the installation and incidental expenses necessary for power generation using natural energy such as wind power and solar heat.

The effectiveness of the invention is not limited as mentioned above, and it should be understood to those skilled in the art that the effectiveness of the invention may include another effectiveness as not mentioned above from the detailed description of the present invention.

| [Explanations of Reference Numerals] | |
|---|---|
| 100: Piston | 110: Magnet rotation plate |
| 110a: First magnet rotation plate | 110b: Second magnet rotation plate |
| 110c: Third magnet rotation plate | 111: Driving motor |
| 112: Rotating shaft | 120: Magnet movement plate |
| 120a: First magnet movement plate | 120b: Second magnet movement plate |
| 121: Guide protrusion | 122: Rod connection shaft |
| 123: Bearing | 124: Semiarch-shaped upper body |
| 125: Semiarch-shaped lower base body | 126: Magnet |
| 126a: Main magnet | 126b: Auxiliary magnet |
| 130: Piston case | 131: Guide groove |
| 132: Connection shaft through hole | 200: Crank |
| 210: Reciprocating rod | 220: Crankshaft |
| 230: Driving gear | 300: Generator |
| 310: Driven gear | 320: Generation motor |

BEST MODE FOR INVENTION

Hereinafter, an explanation of a configuration and an operation of an optimal embodiment of the present invention will be given with reference to the attached drawings wherein the embodiment may be embodied in different forms and in the drawing figures, the shapes of elements may be exaggerated for clarity of illustration. Also, in explaining the embodiment, detailed description on known elements or functions will be omitted if it is determined that such description will interfere with understanding of the embodiment.

Figure 1:
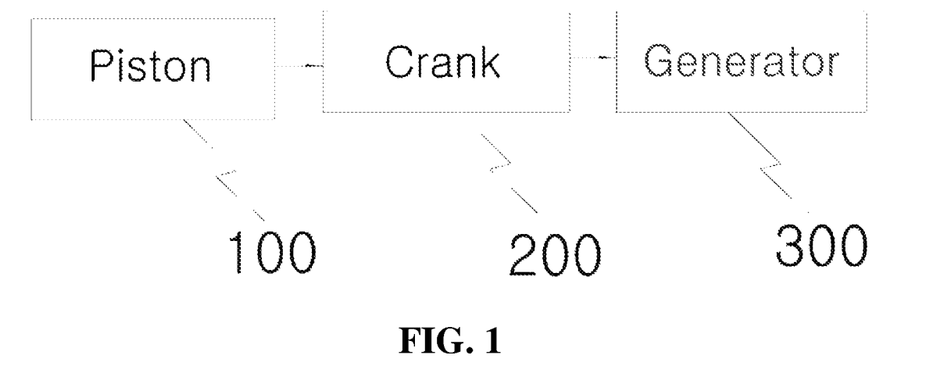
FIG. 1 is a block diagram showing a generator-driving device using magnetism according to an embodiment of the present invention.

FIG. 1 is a block diagram showing a generator-driving device using magnetism according to an embodiment of the present invention, and the generator-driving device using magnetism includes a piston 100, a crank 200, and a generator 300.

In detail, the piston 100 includes magnet rotation plates 110 spaced apart from each other at a given distance on both sides thereof in such a way as to be rotatably fixed to a rotating shaft 112 disposed at the inside of a driving motor 111 if start power is transmitted thereto, each magnet rotation plate 110 having a plurality of magnets 126 located at the inside of the outer periphery thereof in such a way as to allow one magnet to have a different polarity from the neighboring magnet and a magnet movement plate 120 reciprocating along the rotating shaft 112 between the magnet rotation plates 110 and having a plurality of magnets 126 located at the inside of the outer periphery thereof in such a way as to allow one magnet to have a different polarity from the neighboring magnet, while facing the magnets 126 of the magnet rotation plates 110, so that while the magnet movement plate 120 is rotating together with the magnet rotation plates 110 if the magnets 126 facing the magnets 126 of the magnet rotation plates 110 have different polarities from the magnets 126 of the magnet rotation plates 110, attraction occurs, and if the magnets 126 have the same polarities as the magnets 126 of the magnet rotation plates 110, repulsion occurs.

Figure 2:
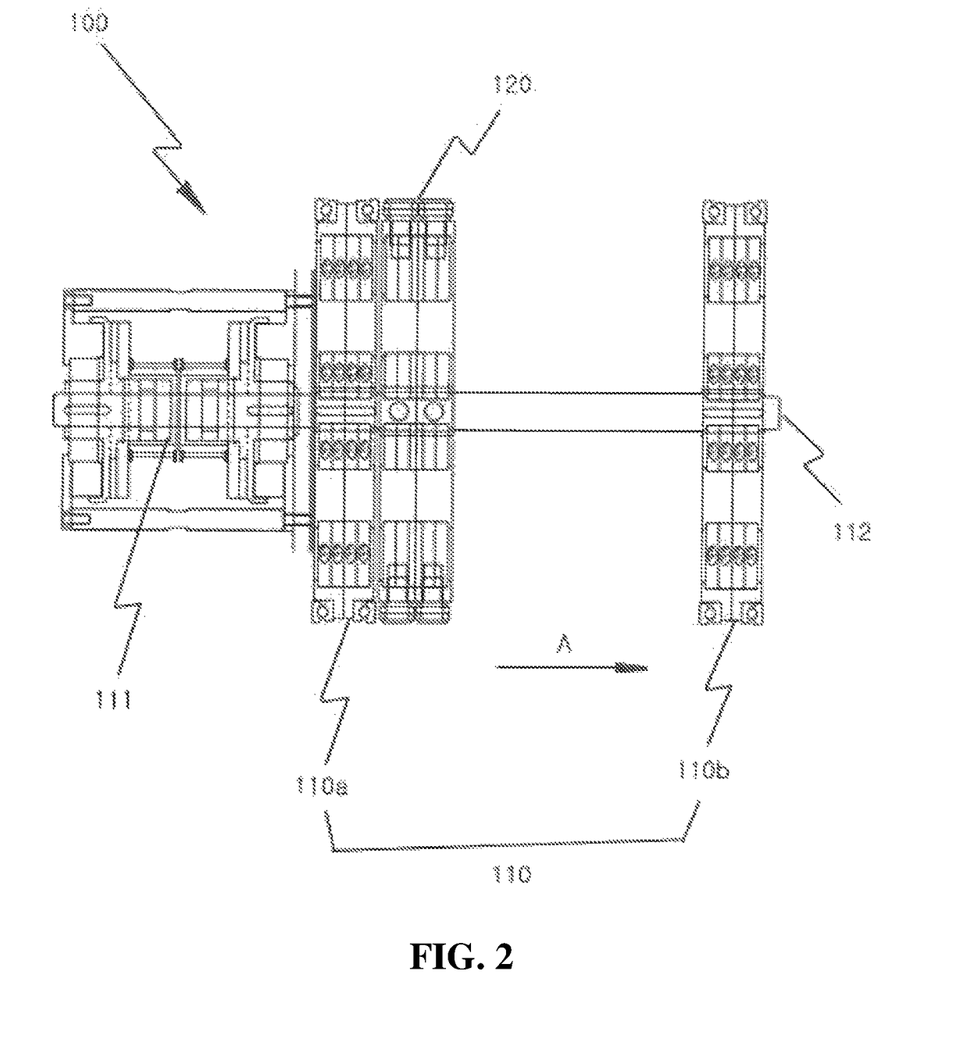
FIG. 2 is an exemplary view showing a piston according to the embodiment of the present invention.

For example, as shown in FIG. 2, the magnet rotation plates 110 located on both sides of the piston 100 include a first magnet rotation plate 110a and a second magnet rotation plate 110b fitted spaced apart from each other to the rotating shaft 112, and in this case, if the driving motor 111 operates by means of switch control, the first and second magnet rotation plates 110a and 110b rotate to allow the magnet movement plate 120 to reciprocate along the rotating shaft 112 by means of attraction and repulsion.

As shown in FIG. 2, the magnet movement plate 120 of the piston 100 is fitted to the rotating shaft 112, and if the magnet movement plate 120 is located between the first and second magnet rotation plates 110a and 110b, it reciprocates to the left and right by means of attraction and repulsion.

Figure 3:
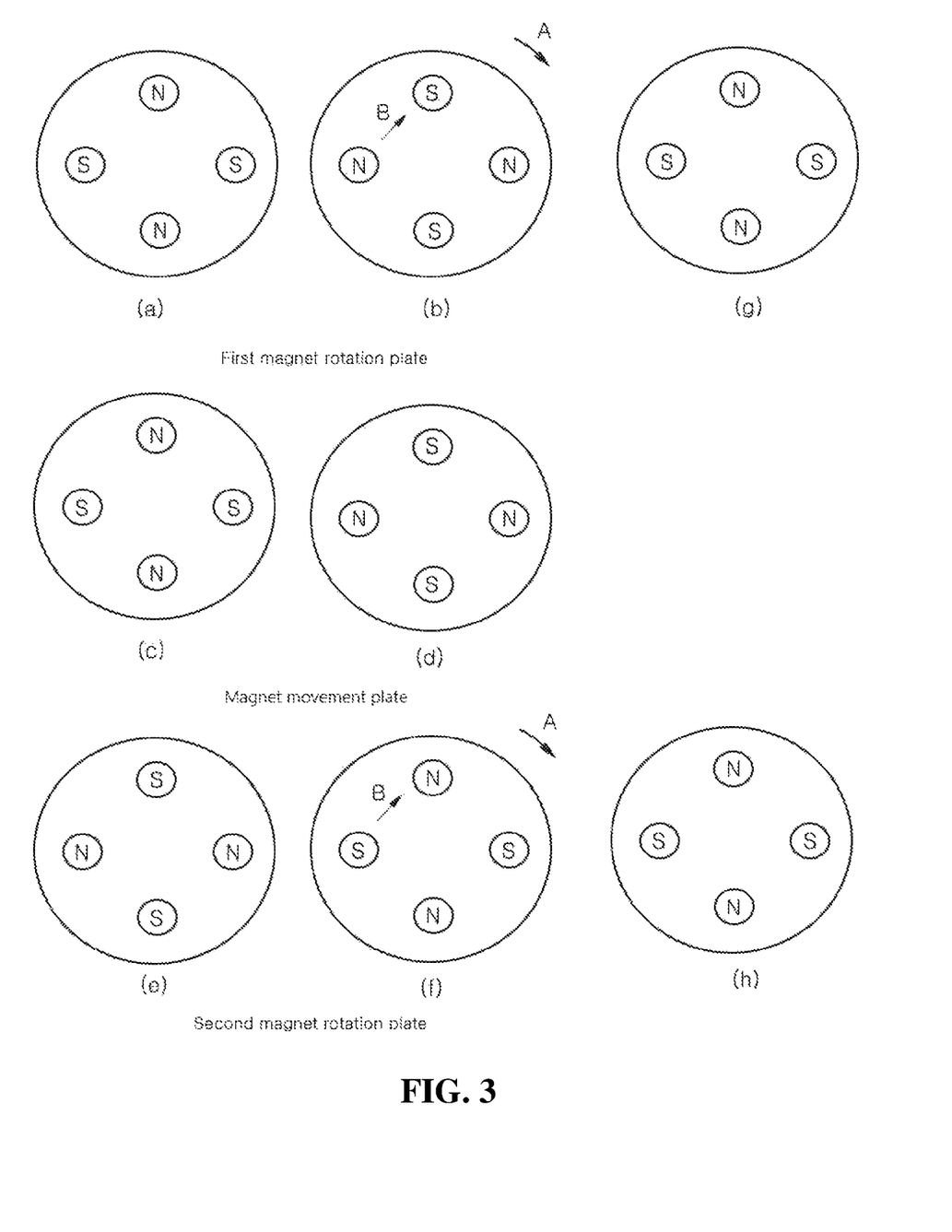
FIG. 3 is an exemplary view showing the operating principle of a magnet movement plate according to the embodiment of the present invention.

First, an explanation of an operation of the magnet movement plate 120 by means of the attraction and repulsion between the magnet rotation plates 110 and the magnet movement plate 120 will be given. FIG. 3a shows the surface of the first magnet rotation plate 110a as shown in FIG. 2 that does not come into contact with the magnet movement plate 120 (that is, the surface of the first magnet rotation plate 110a toward the driving motor 111 in FIG. 2), FIG. 3b shows the surface of the first magnet rotation plate 110a as shown in FIG. 2 that comes into contact with the magnet movement plate 120, FIG. 3c shows the surface of the magnet movement plate 120 that comes into contact with the first magnet rotation plate 110a as shown in FIG. 2, FIG. 3d shows the surface of the magnet movement plate 120 that comes into contact with the second magnet rotation plate 110b as shown in FIG. 2, FIG. 3e shows the surface of the second magnet rotation plate 110b as shown in FIG. 2 that comes into contact with the magnet movement plate 120, and FIG. 3f shows the surface of the second magnet rotation plate 110b as shown in FIG. 2 that does not come into contact with the magnet movement plate 120.

Like this, if the first and second magnet rotation plates 110a and 110b and the magnet movement plate 120 are installed, the polarities of the magnets 126 of the first magnet rotation plate 110a as shown in FIG. 3b are different from the polarities of the facing magnets 126 of the magnet movement plate 120, and in detail, the S poles face the N poles and the N poles face the S poles, so that as shown in FIG. 2, the attraction occurs to allow the magnet movement plate 120 to come into close contact with the first magnet rotation plate 110a. Simultaneously, the polarities of the magnets 126 of the magnet movement plate 120 as shown in FIG. 3d are the same as the polarities of the second magnet rotation plate 110b as shown in FIG. 3e, and in detail, the S poles face each other and the N poles face each other, so that as shown in FIG. 2, the repulsion occurs to allow the magnet movement plate 120 to come into close contact with the first magnet rotation plate 110a through the second magnet rotation plate 110b.

In this case, if the first and second magnet rotation plates 110a and 110b rotate in the clockwise direction A as shown in FIGS. 3b and 3f, the positions of their magnets 126 are changed along directions B as shown in FIGS. 3b and 3f. That is, as shown in in FIGS. 3g and 3h, the positions of the S poles are changed into the positions of the N poles, and the positions of the N poles into the positions of the S poles. As a result, the polarities of the magnets 126 of the first magnet rotation plate 110a are the same as the polarities of the magnets 126 of the magnet movement plate 120 as shown in FIG. 3c, and in detail, the N poles face each other and the S poles face each other, so that the repulsion occurs. Simultaneously, the polarities of the magnets 126 of the magnet movement plate 120 as shown in FIG. 3d are different from the polarities of the magnets 126 of the second magnet rotation plate 110b as shown in FIG. 3h, and in detail, the S poles face the N poles and the N poles face the S poles, so that the magnet movement plate 120 moves in the direction of an arrow A as shown in FIG. 2.

Accordingly, the magnet movement plate 120 repeatedly reciprocates naturally between the first and second magnet rotation plates 110a and 110b along the rotating shaft 112 by means of the consistent rotations of the magnet rotation plates 110.

The crank 200 includes a reciprocating rod 210 connected to one side of the magnet movement plate 120 in such a way as to move forward and backward during the reciprocation of the magnet movement plate 120, a crankshaft 220 connected to the other side of the reciprocating rod 210 to convert linear motions caused by the forward and backward movements of the reciprocating rod 210 into rotary motions, and a driving gear 230 located at a given position of the crankshaft 220 in such a way as to be connected to a driven gear 310 from which the number of revolutions larger than the number of revolutions caused by the rotary motions of the crankshaft 220 is generated.

For example, the reciprocating rod 210 of the crank 200 will be explained with reference to FIG. 4, while the first and second magnet rotation plates 110a and 110b as shown in FIG. 2 are being omitted to help the overall operating principle of the present invention where the crankshaft 220 and the driving gear 230 are included understood. The reciprocating rod 210 is connected to one side of the magnet movement plate 120, and if the first and second magnet rotation plates 110a and 110b rotate under the operating principle of the magnet rotation plates 110 and the magnet movement plate 120 as described in FIG. 3, the reciprocating rod 210 moves forward and backward while the magnet movement plate 120 is reciprocating along the rotating shaft 112 by means of attraction and repulsion.

Figure 4:
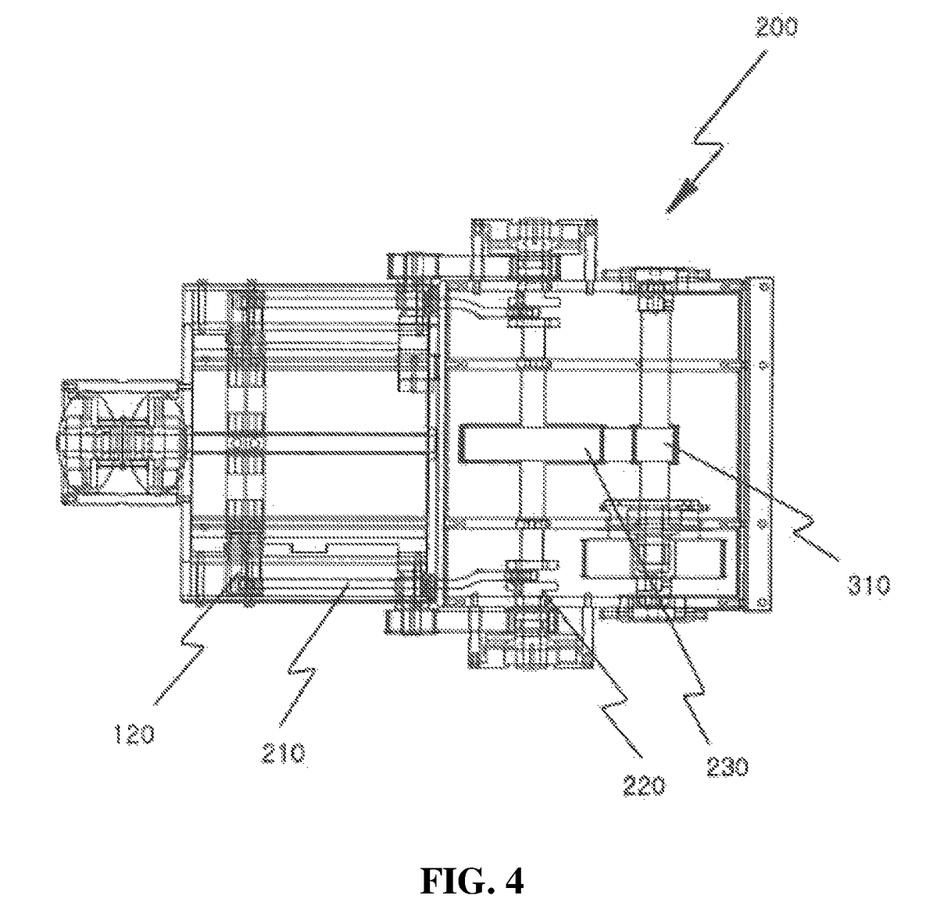
FIG. 4 is an exemplary view showing a crank according to the embodiment of the present invention.

Further, as shown in FIG. 4, the crankshaft 220 of the crank 200 is connected to the other side of the reciprocating rod 210 whose one side is connected to the magnet movement plate 120 and thus converts the forward and backward movements of the reciprocating rod 210 into the rotary motions for generating electric power in the generator 300.

Moreover, as shown in FIG. 4, the driving gear 230 of the crank 200 is connected to the driven gear 310 that performs, for example, five revolutions if the driving gear 230 performs one revolution, through the conversion of the rotary motions of the crankshaft 220, so that the driving gear 230 provides the rotational force corresponding to the five revolutions as electric power for power generation to the generator 300.

That is, the driven gear 310 is desirably configured to acquire the number of revolutions corresponding to the capacity of the generator 300 according to the rotations of the driving gear 230.

The generator 300 has the driven gear 310 located inside the crank 200 to receive the rotational force from the driving gear 230 and thus receives the electric power required for power generation from the driven gear 310.

Figure 5:
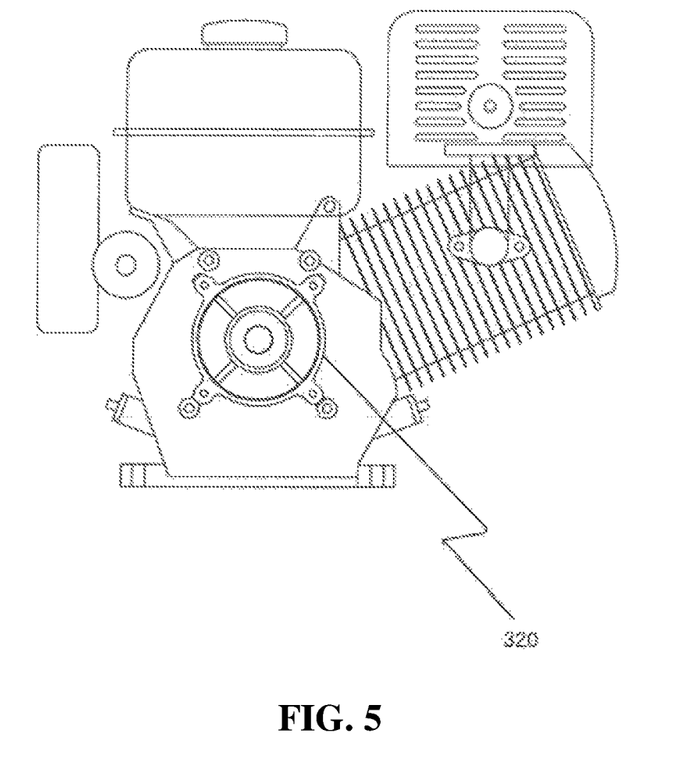
FIG. 5 is an exemplary view showing a generator according to the embodiment of the present invention.

For example, the driven gear 310 of the generator 300 is desirably designed to have the number of revolutions for power generation adequate for a designed device. In the case of a small size device, that is, the driven gear 310 has ten revolutions per one revolution of the driving gear 230, and in the case of a middle size device, the driven gear 310 has 20 revolutions per one revolution of the driving gear 230. The driven gear 310 is easy to be adjusted in the number of revolutions and connected to a driving motor 320 of the generator 300 as shown in FIG. 5.

In this case, the coupled relation between the driven gear 310 and the driving motor 320 of the generator 300 may be designed in different methods, and an explanation of the methods will be avoided.

To provide the coupled relation between the driven gear 310 and the generation driving motor 320 of the generator 300, desirably, elements rotatable may be designed and adjusted by means of spur gears, helical gears, worm gears, screw gears, belts, chains, and the like.

Further, a plurality of magnet rotation plates 110 are spaced apart from one another at a given distance in such a way as to be rotatably fixed to the rotating shaft 112, and a plurality of magnet movement plates 120 are located between the neighboring magnet rotation plates 110 to move along the rotating shaft 112, so that desirably, the plurality of magnet movement plates 120 reciprocate to the left and right along the rotating shaft 112 by means of the attraction and repulsion generated by the magnetism during the rotations of the plurality of magnet rotation plates 110.

For example, the plurality of magnet rotation plates 110 are spaced apart from one another at a given distance in such a way as to be rotatably fixed to the rotating shaft 112 rotating by the driving motor 111, and the magnet movement plates 120 are located appropriately according to the number of magnet rotation plates 110 installed, that is, the size of the piston 100.

Further, the number of reciprocating rods 210 and crankshafts 220 increases according to the number of magnet movement plates 120 installed, and accordingly, the rotational force becomes strong. Therefore, the magnet movement plates 120 can be designed appropriately according to the capacity of the generator 300. In this case, the reciprocating rods 210 connected to the corresponding magnet movement plates 120 are different in size according to the moving distances of the magnet movement plates 120, and accordingly, the crankshafts 220 connected to the reciprocating rods 210 or the components adjacent to the crankshafts 220 may be different in shape.

Figure 6:
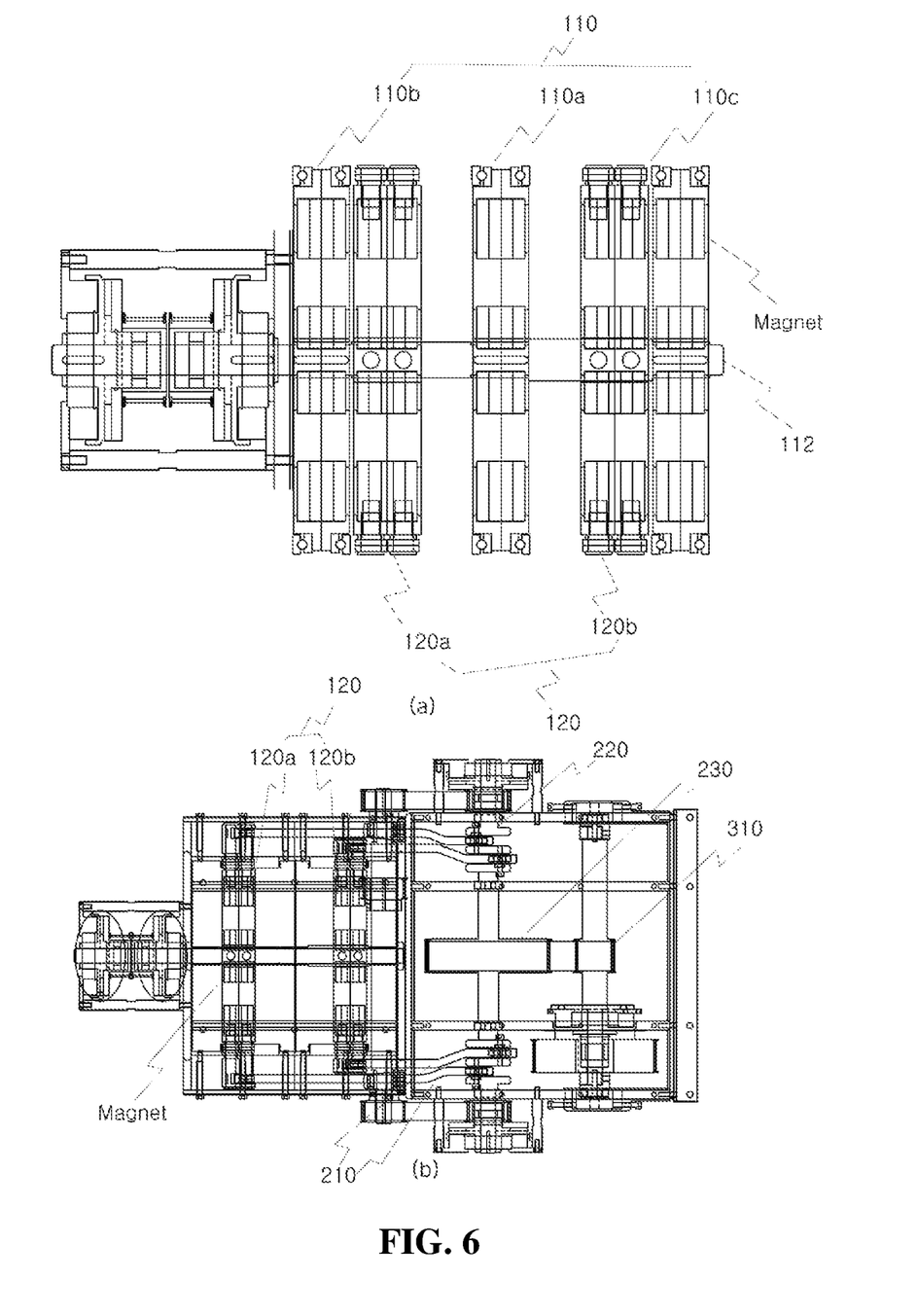
FIG. 6 is an exemplary view showing the installation of a plurality of magnet rotation plates and magnet movement plates according to the embodiment of the present invention.

For example, in detail, an embodiment where three magnet rotation plates 110 and two magnet movement plates 120 are provided will be explained below. As shown in FIG. 6a, the second magnet rotation plate 110b is located on the left side around the first magnet rotation plate 110a, whereas the third magnet rotation plate 110c is located on the right side around the first magnet rotation plate 110a. Further, the first magnet movement plate 120a is located between the first and second magnet rotation plate 110a and 110b, whereas the second magnet movement plate 120b is located between the first and third magnet rotation plate 110a and 110c.

In such an embodiment where the three magnet rotation plates 110 and the two magnet movement plates 120 are provided, as shown in FIG. 6b, the three magnet rotation plates 110 are omitted to explain the operating principle more obviously, and as the reciprocating rods 210 of the two magnet movement plates 120 are provided, accordingly, the crankshafts 220 rotatably connected to the corresponding reciprocating rods 210 are added, which naturally changes the components adjacent to the crankshafts 220.

Further, each magnet movement plate 120 has guide protrusions 121 protruding from both side ends of a central vertical line thereof to allow the linear motions to be performed during the reciprocating motions thereof and rod connection shafts 122 protruding from both side ends of a central horizontal line thereof in such a way as to allow the reciprocating rod 210 to be fitted thereto.

Figure 7:
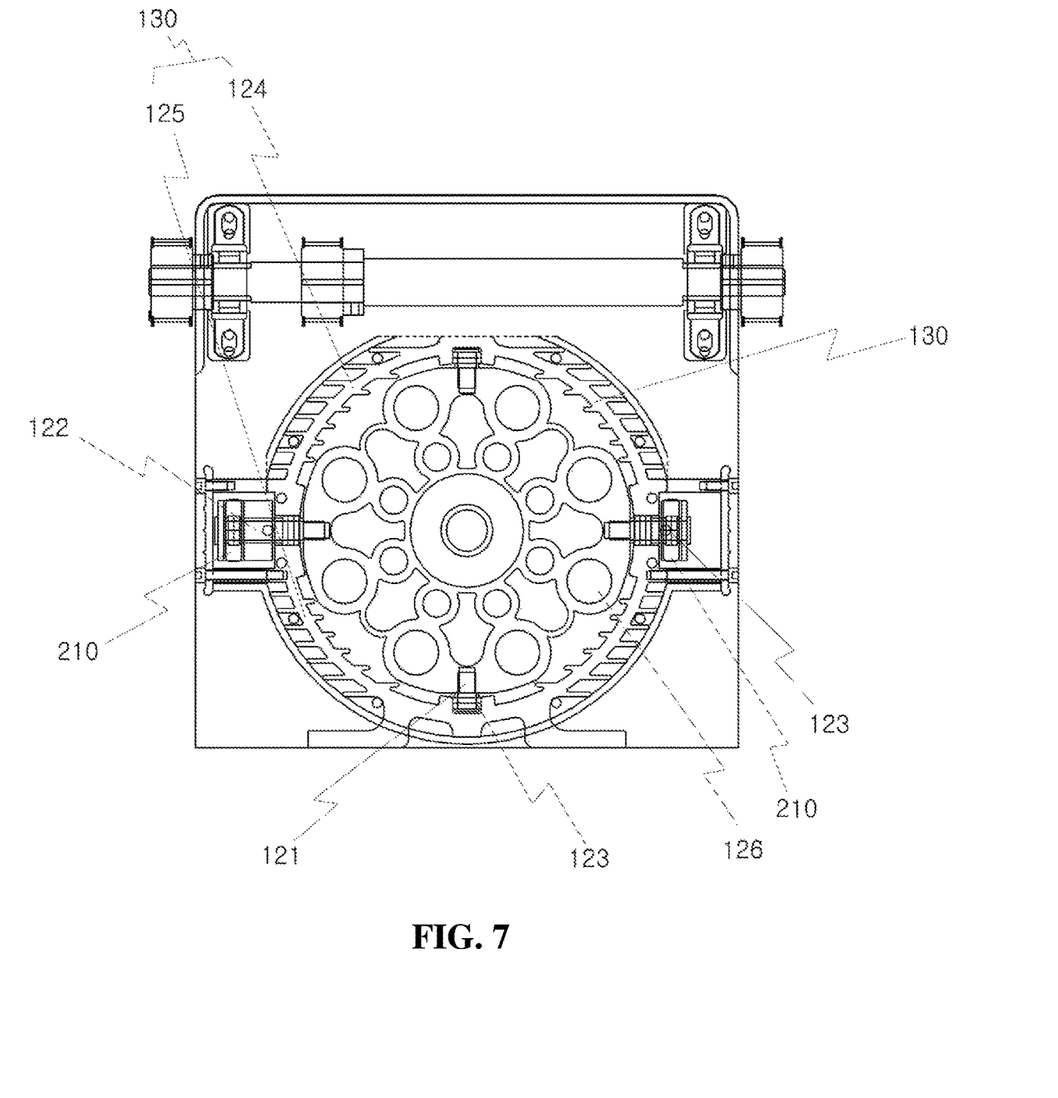
FIG. 7 is an exemplary view showing coupling between a piston case and the magnet movement plates according to the embodiment of the present invention.

For example, to allow the magnet movement plate 120 to naturally reciprocate along the rotating shaft 112 by means of the attraction and repulsion between the neighboring magnet rotation plates 110, as shown in FIG. 7, the guide protrusions 121 protrude from both side ends of the central vertical line thereof to allow the linear motions to be performed during the reciprocating motions thereof, and accordingly, the magnet movement plate 120 performs smooth linear motions during the reciprocating motions thereof. Further, as shown in FIG. 7, the rod connection shafts 122 protrude from both side ends of the central horizontal line thereof to allow the linear motions generated by the forward and backward movements of the reciprocating rod 210 to become smoother.

Furthermore, a piston case 130 includes guide grooves 131 formed on the inner peripheral surface thereof to guide the reciprocating motions of the guide protrusions 121 protruding from both side ends of the central vertical lines of the magnet movement plates 120 and connection shaft through holes 132 formed thereon to allow the rod connection shafts 122 protruding from both side ends of the central horizontal lines of the magnet movement plates 120 to linearly reciprocate with ease.

Figure 8:
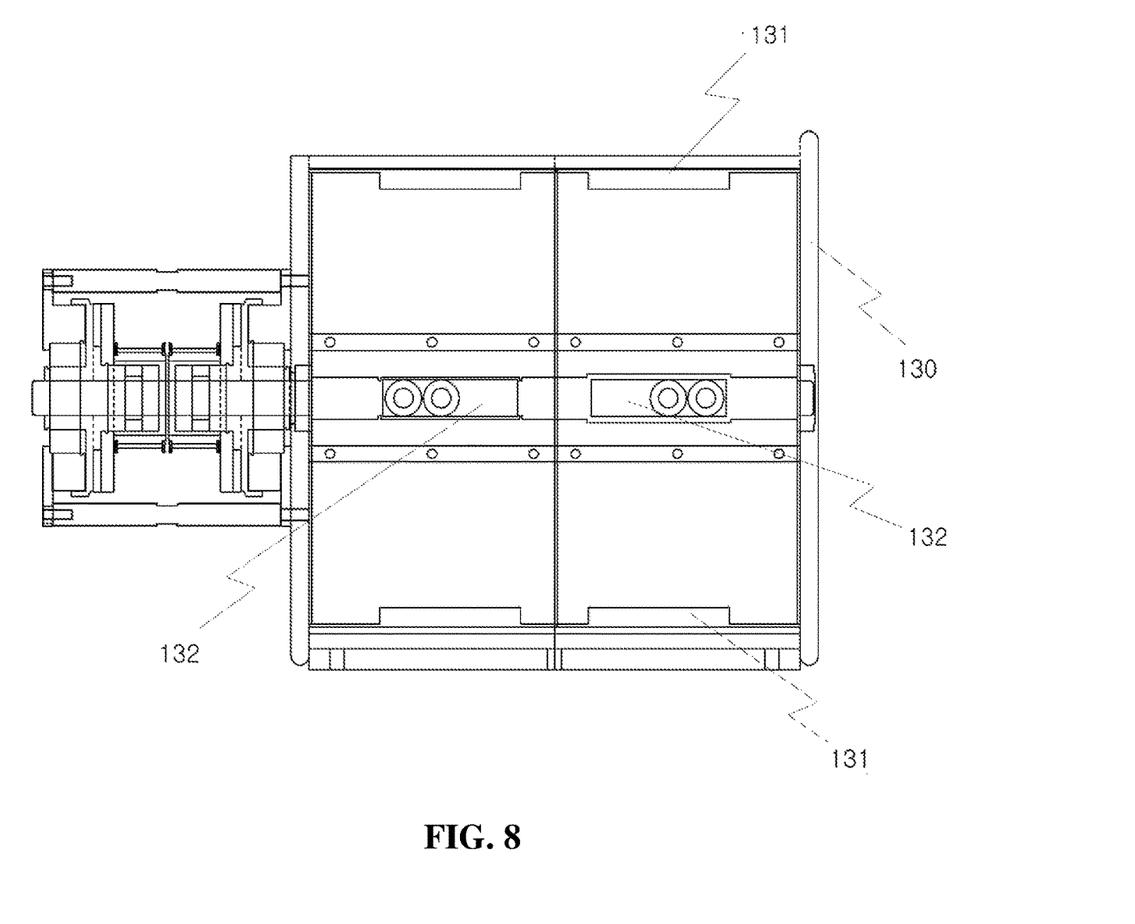
FIG. 8 is an exemplary view showing the piston case according to the embodiment of the present invention.
Figure 9:
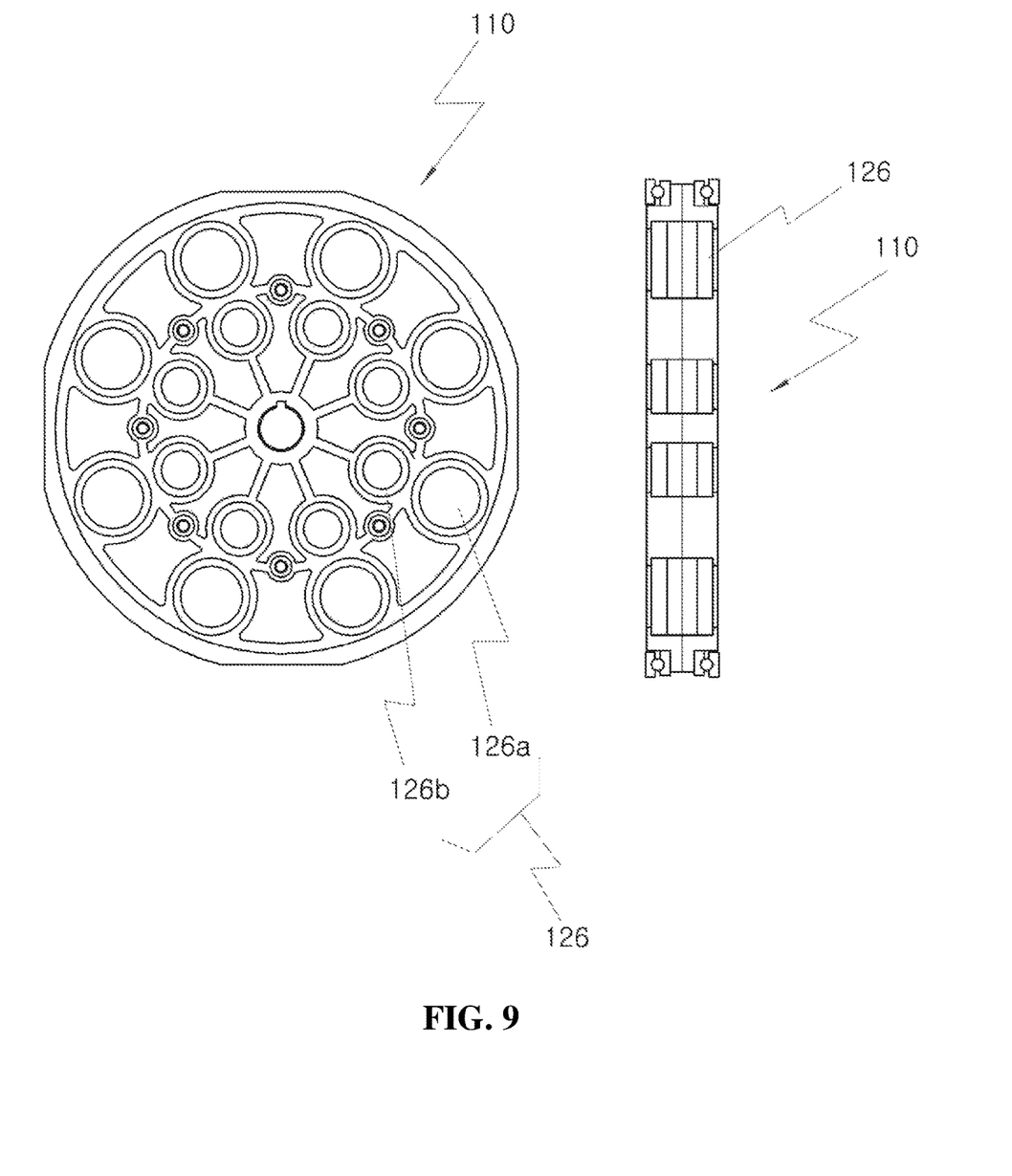
FIG. 9 is an exemplary view showing arrangements of magnets of the magnet rotation plate according to the embodiment of the present invention.
Figure 10:
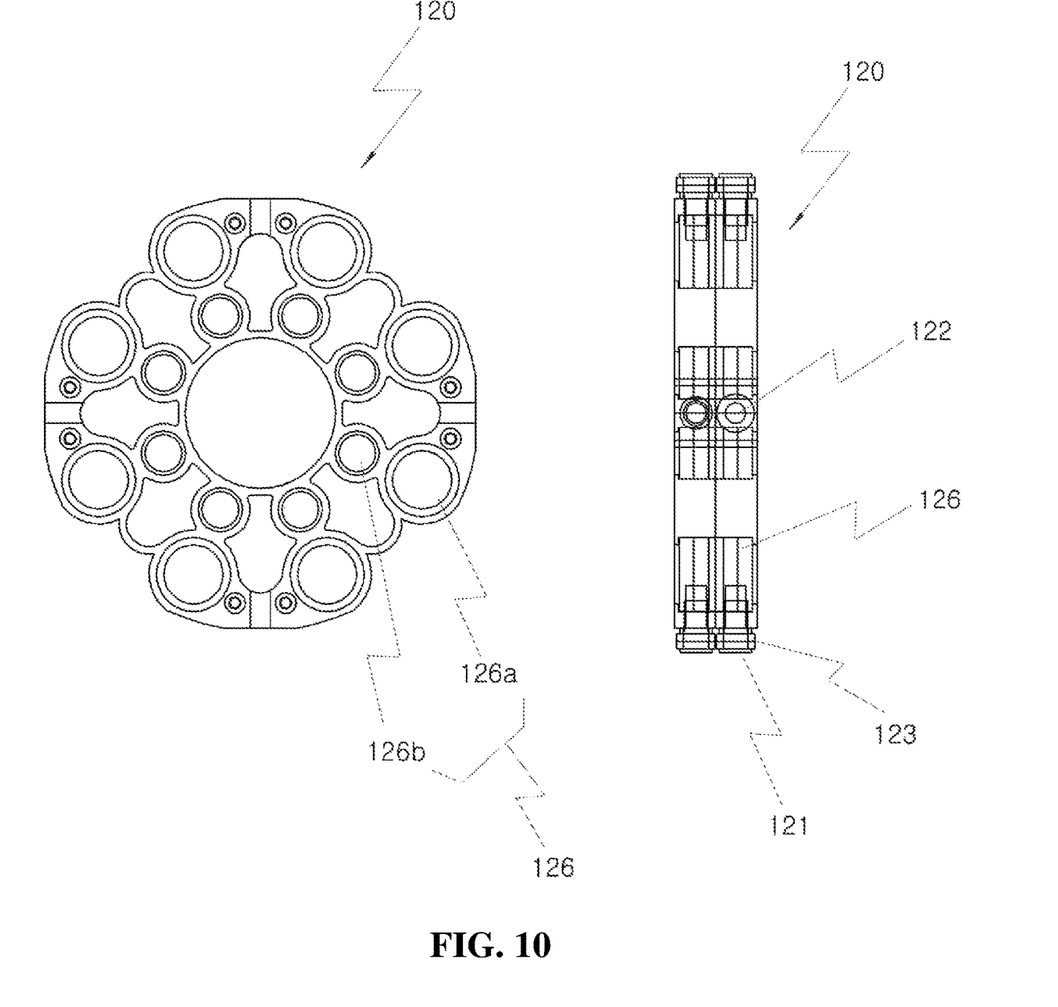
FIG. 10 is an exemplary view showing arrangements of magnets of the magnet movement plate according to the embodiment of the present invention.

For example, as the magnet movement plate 120 is provided with the guide protrusions 121 and the rod connection shafts 122, the guide protrusions 121 as shown in FIG. 7 move only within the guide grooves 131 formed on the inner peripheral surface of the piston case 130 as shown in FIG. 8 (wherein the two magnet movement plates 120 as shown in FIG. 6a are provided to make the present invention understood), and the rod connection shafts 122 as shown in FIG. 7 move only within the connection shaft through holes 132 formed on one side of the inner peripheral surface of the piston case 130 as shown in FIG. 8, thereby naturally moving along the rotating shaft 112, without any locking.

As a result, as shown in FIG. 8, as the guide protrusions 121 protruding from both side ends of the central vertical line of the magnet movement plate 120 are inserted into the guide grooves 131 formed on the piston case 130, the reciprocating motions of the guide protrusions 121 are guided by means of the guide grooves 131 and the range of the reciprocating motions is limited by means of the guide grooves 131, thereby accurately performing the reciprocating motions of the magnet movement plate 120. Further, as shown in FIG. 8, as the rod connection shafts 122 protruding from both side ends of the central horizontal line of the magnet movement plate 120 are inserted into the connection shaft through holes 132 formed on the piston case 130, the reciprocating motions of the rod connection shafts 122 are guided by means of the connection shaft through holes 132 and the forward and backward movements of the magnet movement plate 120 are accurately performed by means of the rod connection shafts 122.

Further, the guide protrusions 121 and the rod connection shafts 122 each have bearings 123 adapted to easily slide the magnet movement plate 120 and the reciprocating rod 210 that reciprocate along the guide grooves 131 and the connection shaft through holes 132.

Furthermore, the guide grooves 131, the connection shaft through holes 132, the guide protrusions 121, and the rod connection shafts 122 desirably serve to prevent the magnet movement plates 120 reciprocating to the left and right from being attached to the magnet rotation plates 110 rotating when different polarities therebetween meet with each other, while guiding the reciprocating motions of the magnet movement plates 120.

For example, when the magnet movement plates 120 smoothly reciprocate to the left and right, the power generation in the generator 300 is easy, but if the magnet rotation plates 110 and the magnet moving plates 120 are almost attached to each other by means of attraction, the force of magnetism is too strong to be hard to allow the magnet moving plates 120 to reciprocate. Therefore, the attachment is prevented through the guide grooves 131, the connection shaft through holes 132, the guide protrusions 121, and the rod connection shafts 122.

Further, as shown in FIG. 7, the piston case 130 is divided into two parts, that is, a semiarch-shaped upper body 124 adapted to cover the magnet movement plates 120 and a semiarch-shaped lower base body 125 adapted to supportingly accommodate the magnet rotation plates 110, and accordingly, the piston case 130 is easy in maintenance.

Furthermore, the magnets 126 of each magnet rotation plate 110 and the magnets 126 of each magnet movement plate 120 desirably consist of main magnets 126a disposed on the corresponding surfaces between the magnet rotation plate 110 and the magnet movement plate 120 to generate attraction and repulsion therefrom and auxiliary magnets 126b having smaller sizes than the main magnets 126a.

For example, the main magnets 126a and the auxiliary magnets 126b are arranged in various shapes according to the designs of the magnet rotation plate 110 and the magnet movement plate 120, and in this case, they may be added or omitted. If the auxiliary magnets 126b are added, the linear reciprocating motions of the magnet movement plate 120 increase to improve the quantity of power generated.

Further, the magnets 126 of each magnet rotation plate 110 and the magnets 126 of each magnet movement plate 120 are desirably serially connected according to the thicknesses of the magnet rotation plate 110 and the magnet movement plate 120.

For example, if the thicknesses of the magnet rotation plate 110 and the magnet movement plate 120 are changed due to various conditions, such as the length of the rotating shaft 112 inside the piston 100, the number of magnet rotation plates and magnet movement plates, and the like, the magnets 126 of the magnet rotation plate 110 and the magnets 126 of the magnet movement plate 120 are serially connected.

Further, the main magnets 126a and the auxiliary magnets 126b are desirably designed to be adjusted in arranged distance according to the strength of the attraction and repulsion interacting with each other.

Figure 11:
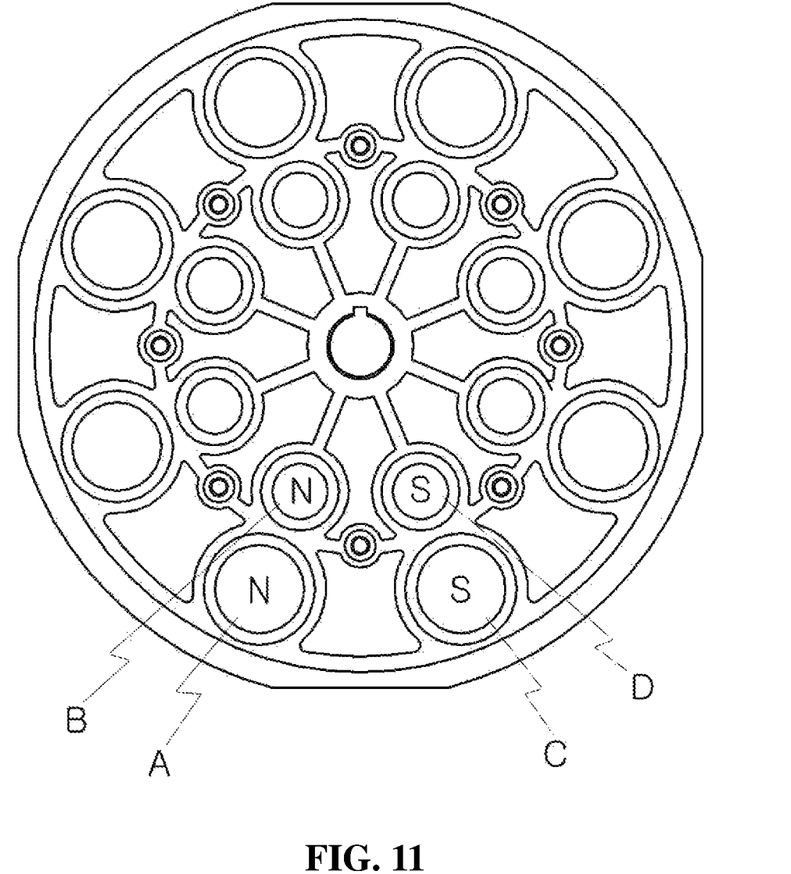
FIG. 11 is an exemplary view showing arrangements of magnets for preventing magnetic forces of the magnets from offsetting according to the embodiment of the present invention.

For example, the main magnets 126a and the auxiliary magnets 126b are desirably designed to be adjusted in arranged distance so that the linear motions of the magnet movement plates 120 are rarely influenced by the magnetic forces of the magnet rotation plates 110 and the magnet movement plates 120 for power generation in the generator 300 due to the repulsion between the magnetic force of the N pole generated by a reference symbol A as shown in FIG. 11 and the magnetic force of the N pole generated by a reference symbol B as shown in FIG. 11, the repulsion between the magnetic force of the S pole generated by a reference symbol C as shown in FIG. 11 and the magnetic force of the S pole generated by a reference symbol D as shown in FIG. 11, the attraction between the magnetic force of the N pole generated by the reference symbol A as shown in FIG. 11 and the magnetic force of the S pole generated by the reference symbol C as shown in FIG. 11, the attraction between the magnetic force of the N pole generated by the reference symbol B as shown in FIG. 11 and the magnetic force of the S pole generated by the reference symbol D as shown in FIG. 11, the attraction between the magnetic force of the N pole generated by the reference symbol B as shown in FIG. 11 and the magnetic force of the S pole generated by the reference symbol C as shown in FIG. 11, and the attraction between the magnetic force of the N pole generated by the reference symbol A as shown in FIG. 11 and the magnetic force of the S pole generated by the reference symbol D as shown in FIG. 11.

As a result, the main magnets 126a and the auxiliary magnets 126b are arranged in consideration of the sizes of the magnet rotation plates 110 and the magnet movement plates 120, the number of revolutions of the driving gear 230 as required for power generation, and the like, so that the offset of the magnetic forces is minimally generated, and further, their arranged distance is adjusted by means of the sizes of the magnet rotation plates 110 and the magnet movement plates 120 and their number installed, so that the offset of magnetic forces are prevented.

The optimal embodiments of the present invention have been explained with respect to the attached drawings and the detailed description, and the terms used in this application are used to only describe specific exemplary embodiments and are not intended to restrict the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A generator-driving device using magnetism comprising:
   a piston comprising magnet rotation plates spaced apart from each other at a given distance on both sides thereof in such a way as to be rotatably fixed to a rotating shaft disposed at the inside of a driving motor if start power is transmitted thereto, each magnet rotation plate having a plurality of magnets located at the inside of the outer periphery thereof in such a way as to allow one magnet to have different polarities from the neighboring magnet and a magnet movement plate reciprocating along the rotating shaft between the magnet rotation plates and having a plurality of magnets located at the inside of the outer periphery thereof in such a way as to allow one magnet to have different polarities from the neighboring magnet, while facing the magnets of the magnet rotation plates, so that while the magnet movement plate is rotating together with the magnet rotation plates if the magnets facing the magnets of the magnet rotation plates have different polarities from the magnets of the magnet rotation plates, attraction occurs, and if the magnets have the same polarities as the magnets of the magnet rotation plates, repulsion occurs;
   a crank comprising a reciprocating rod connected to one side of the magnet movement plate in such a way as to move forward and backward during the reciprocation of the magnet movement plate, a crankshaft connected to the other side of the reciprocating rod to convert the linear motions caused by the forward and backward movements of the reciprocating rod into rotary motions, and a driving gear located at a given position of the crankshaft in such a way as to be connected to a driven gear from which the number of revolutions larger than the number of revolutions caused by the rotary motions of the crankshaft is generated; and
   a generator comprising the driven gear located inside the crank in such a way as to receive the rotational force from the driving gear to receive electric power required for power generation from the driven gear.

2. The generator-driving device using magnetism according to claim 1, wherein a plurality of magnet rotation plates are spaced apart from one another at a given distance in such a way as to be rotatably fixed to the rotating shaft, and a plurality of magnet movement plates are located between the neighboring magnet rotation plates to move along the rotating shaft, so that the plurality of magnet movement plates reciprocate to the left and right along the rotating shaft by means of the attraction and repulsion generated by the magnetism during the rotations of the plurality of magnet rotation plates.

3. The generator-driving device using magnetism according to claim 1, wherein the magnet movement plate comprises guide protrusions protruding from both side ends of a central vertical line thereof to allow the linear motions to be performed during the reciprocating motions thereof and rod connection shafts protruding from both side ends of a central horizontal line thereof in such a way as to allow the reciprocating rod to be fitted thereto.

4. The generator-driving device using magnetism according to claim 3, further comprising a piston case having guide grooves formed on the inner peripheral surface thereof to guide the reciprocation motions of the guide protrusions protruding from both side ends of the central vertical lines of the magnet movement plates and connection shaft through holes formed thereon to allow the rod connection shafts protruding from both side ends of the central horizontal lines of the magnet movement plates to linearly reciprocate with ease.

5. The generator-driving device using magnetism according to claim 4, wherein the guide grooves, the connection shaft through holes, the guide protrusions, and the rod connection shafts serve to prevent the magnet movement plates reciprocating to the left and right from being attached to the magnet rotation plates rotating when different polarities meet with each other, while guiding the reciprocating motions of the magnet movement plates.

6. The generator-driving device using magnetism according to claim 1, wherein the magnets of each magnet rotation plate and the magnets of each magnet movement plate comprise main magnets disposed on the corresponding surfaces between the magnet rotation plate and the magnet movement plate to generate attraction and repulsion therefrom and auxiliary magnets having smaller sizes than the main magnets.

7. The generator-driving device using magnetism according to claim 6, wherein the magnets of each magnet rotation plate and the magnets of each magnet movement plate are serially connected according to the thicknesses of the magnet rotation plate and the magnet movement plate.

8. The generator-driving device using magnetism according to claim 6, wherein the main magnets and the auxiliary magnets are designed to be adjusted in arranged distance according to the strength of the attraction and repulsion interacting with each other.

9. The generator-driving device using magnetism according to claim 7, wherein the main magnets and the auxiliary magnets are designed to be adjusted in arranged distance according to the strength of the attraction and repulsion interacting with each other.

* * * * *